US012615311B2

(12) United States Patent
Borgonovo et al.

(10) Patent No.: US 12,615,311 B2
(45) Date of Patent: Apr. 28, 2026

(54) NETWORK ARCHITECTURE, CORRESPONDING VEHICLE AND METHOD

(71) Applicant: STMicroelectronics International N.V., Geneva (CH)

(72) Inventors: Giampiero Borgonovo, Giussano (IT); Lorenzo Re Fiorentin, Oulx (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/814,132

(22) Filed: Aug. 23, 2024

(65) Prior Publication Data

US 2025/0080611 A1 Mar. 6, 2025

(30) Foreign Application Priority Data

Sep. 6, 2023 (IT) ........................ 102023000018294

(51) Int. Cl.
*H04L 67/12* (2022.01)
*G06F 9/455* (2018.01)

(52) U.S. Cl.
CPC .......... *H04L 67/12* (2013.01); *G06F 9/45558* (2013.01); *G06F 2009/45595* (2013.01)

(58) Field of Classification Search
CPC ......... H04L 67/12; H04L 45/76; H04L 45/66; H04L 12/40; H04L 12/66; H04L 49/70;
(Continued)

(56) References Cited

U.S. PATENT DOCUMENTS 9,294,396 B2 * 3/2016 Sundaram ............... H04L 45/72
10,341,263 B2 * 7/2019 Zou ......................... H04L 67/61
(Continued)

FOREIGN PATENT DOCUMENTS

EP 2567512 B1 4/2016

OTHER PUBLICATIONS

"Zynq-7000—All Progammable SoC," Technical Reference Manual, XILINX, Feb. 23, 2015, 1863 pages.

*Primary Examiner* — Azizul Choudhury
(74) *Attorney, Agent, or Firm* — Seed IP Law Group LLP

(57) ABSTRACT

The bandwidth of SOC interfaces is exploited while minimizing the number of physical ports via a networking accelerator for use on board a vehicle, for instance, that comprises: media access control (MAC) controller circuitry configured to provide a MAC port layer to control exchange of information, wherein the exchange of information comprises data flow transmission to virtual machine ports (VMPs) over a data link; virtual machine transmission (VM Tx) bridge circuitry configured to handle transmission data flow to the VMPs; transmission router/switch circuitry configured to route/switch data flow from the MAC controller circuitry to the VM Tx bridge circuitry; and queue handler circuitry configured to provide queue management for data flow between the MAC controller circuitry and the VM Tx bridge circuitry. The VM Tx bridge circuitry comprises virtual destination address circuitry configured to implement router/switch virtualization in the transmission router/switch circuitry with a virtual machine transmission descriptor based on a combination of a virtual machine port (VMP) tag indicative of a physical resource in the queue handler circuitry selectable for data flow transmission, and a virtual machine extended identifier (VMEID).

13 Claims, 4 Drawing Sheets

(58) Field of Classification Search
CPC .. H04L 49/109; H04L 49/3045; H04L 49/111;
G06F 9/45558; G06F 2009/45595
See application file for complete search history.

(56) References Cited

U.S. PATENT DOCUMENTS

| | | | | |
|---|---|---|---|---|
| 2014/0269710 | A1* | 9/2014 | Sundaram | H04L 45/745 |
| | | | | 370/402 |
| 2015/0163072 | A1* | 6/2015 | Kalkunte | H04L 45/745 |
| | | | | 370/392 |
| 2016/0314057 | A1* | 10/2016 | De Oliveira | G06F 11/3612 |
| 2016/0315879 | A1* | 10/2016 | Morris | H04L 49/70 |
| 2017/0118042 | A1* | 4/2017 | Bhattacharya | H04L 12/462 |
| 2018/0357108 | A1* | 12/2018 | Mullender | G06F 9/5077 |
| 2020/0228467 | A1* | 7/2020 | Louzoun | H04L 49/30 |
| 2020/0278935 | A1* | 9/2020 | Borikar | G06F 12/1027 |
| 2022/0066811 | A1* | 3/2022 | Zhao | G06F 9/46 |
| 2024/0095057 | A1 | 3/2024 | Borgonovo et al. | |
| 2025/0045083 | A1* | 2/2025 | Karp | G06F 9/45558 |

* cited by examiner

FIG. 3

NETWORK ARCHITECTURE, CORRESPONDING VEHICLE AND METHOD

BACKGROUND

Technical Field

The description relates to communication networks for use in the automotive sector, for instance.

Examples as discussed herein facilitate providing a flexible, safe and scalable system architecture for an optimized Ethernet router (L2+)/switch (L2)/gateway for high-speed automotive networks, for instance.

Description of the Related Art

Developments in automotive technology are continuous and rapid, with new and complex automotive applications that set ever-increasing connectivity/bandwidth requirements for in-vehicle connections.

The ability to integrate efficient network accelerators capable of switching/routing packets among internal SOC network ports (AXIM ports) with minimal area overhead thus plays an important role in new-generation automotive gateway processors.

Internal system-on-chip, SOC network ports (AXIM, for instance) are capable of supporting high-bandwidth requirements in standard SOC system interfaces via pipeline processing, data parallelism, and various outstanding features such as embedded direct memory access, DMA features.

Adequately exploiting the high bandwidth availability of SOC interfaces while minimizing the number of physical ports of a switch and keeping a high number of virtual-machine, VM ports may represent a challenging goal to pursue.

This applies primarily to exploiting without significant drawbacks the large bandwidth of SOC interfaces with a reduced number of physical ports which leads to a notable reduction of the complexity in terms of gate count, levels of logic, and power consumption.

BRIEF SUMMARY

An object of one or more embodiments is to contribute in providing further improvements in the context discussed in the foregoing.

According to one or more embodiments, such an object is achieved via network architecture (essentially, architecture of a communication system) having the features set forth in the claims that follow.

One or more embodiments relate to a corresponding vehicle. A motor vehicle equipped with an on-board communication network, wherein the network comprises a system as exemplified herein to provide MAC/router/switch/gateway features for such an on-board communication network may be exemplary of such a vehicle.

One or more embodiments relate to a corresponding method.

The claims are an integral part of the technical teaching provided herein in respect of the embodiments.

Examples as discussed provide a low-cost and yet performing solution for hardware (HW) networking of automotive networks which facilitates further extending existing functions of automotive microcontrollers.

Examples as discussed herein facilitate creating unified software platforms for plural brands also in respect of providing requests for quotations, RFQs.

Examples as discussed herein provide an alternative, competitive solution wherein the number of virtual machines, VMs per AXIM (AXI Master) can be increased with a reduced impact on gate count/complexity; additional flexibility is provided in configuring a variable number of VMS per AXIM port according to the application requirements.

In examples as discussed herein an adequate trade-off is reached between area/power consumption, performance (latency, bandwidth) and flexibility, while also offering static configurability of critical parameters of intellectual property, IP cores.

The designation IP (intellectual property) core—or, briefly IP—is currently applied to a block of logic or data that can be used in producing a field programmable gate array (FPGA) or application-specific integrated circuit (ASIC) for a semiconductor device. IP cores are essentially re-usable and portable: a certain IP core is expected to be easily inserted into any technology or design methodology. IP cores can be used, for instance, in Ethernet controllers, peripheral component interconnect PCI interfaces, universal asynchronous receiver/transmitter (UART) modules, or central processing units (CPUs), for instance.

Examples as discussed herein provide an open and flexible micro-architecture which facilitates functional extension of VM support.

Examples as discussed herein facilitate virtualization based on decoupling between VM physical ports mapped on queue control/buffer/interconnect resources and VM virtual ports mapped as extension on a same physical port.

It is noted that, at SOC level, when AXIM transactions are considered, no essential difference between physical and virtual exists (with the exception of the VM identifier tag, VMID) in so far as all VMs can be mapped on different DMA descriptors and transported with related VM attributes.

An underlying concept of examples as discussed herein is thus mapping VMP and VMEID tags in routing/forwarding tables with a different meaning along with a related implementation.

Examples as discussed herein thus offer advantages in terms of reduced complexity (number of physical ports) of the switch along with an increased flexibility in VM virtual port allocation on a VM physical port.

BRIEF DESCRIPTION OF THE SEVERAL VIEWS OF THE DRAWINGS

One or more embodiments will now be described, by way of example only, with reference to the annexed figures, wherein:

FIGS. 3 and 4 are block diagrams illustrative of embodiments of system architecture according to the present disclosure.

Corresponding numerals and symbols in the different figures generally refer to corresponding parts unless otherwise indicated.

The figures are drawn to clearly illustrate the relevant aspects of the embodiments and are not necessarily drawn to scale.

The edges of features drawn in the figures do not necessarily indicate the termination of the extent of the feature.

DETAILED DESCRIPTION

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

Also, for the sake of simplicity and ease of explanation, a same designation may be applied throughout this description to designate a certain node or line as well as a signal occurring at that node or line. The signals/lines indicated as AXIM write and AXIM read in FIG. 3 and FIG. 4, respectively, are an example.

Figure 1:
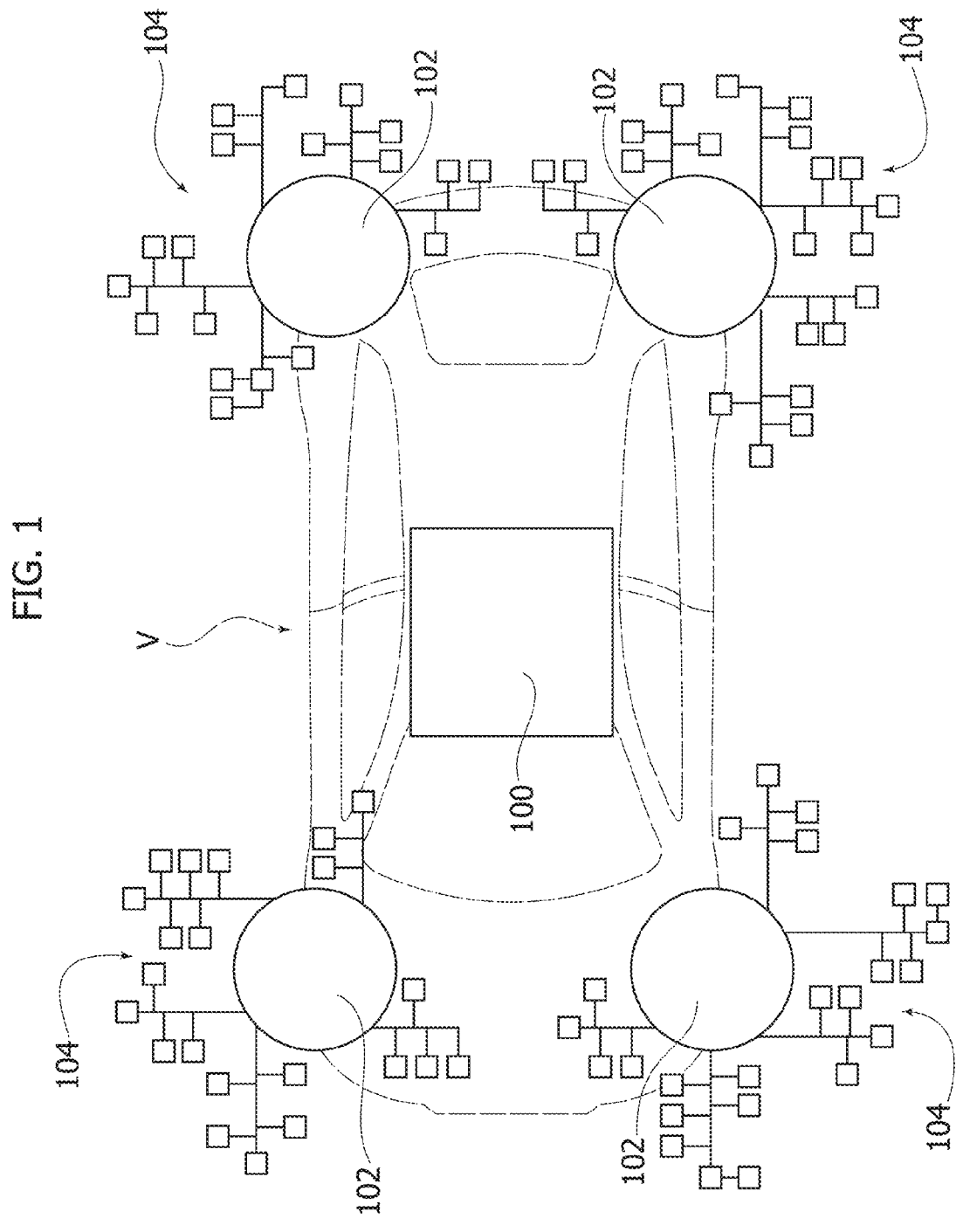
FIG. 1 is a functional diagram illustrative of network architecture applicable, for instance, to an automotive scenario.

Hardware (HW) networking of different automotive communication protocols (Ethernet, LIN, CAN, FlexRay, . . . ) is gradually migrating from a heterogeneous architecture of modules arranged around a central "hub" (gateway/switch) to a hierarchical topology based on different physical zones and functional domains—as illustrated in FIG. 1.

FIG. 1 is exemplary of the possibility of applying architecture as illustrated therein on board a vehicle V such as a motor car based on physical locations, thus having a "central brain" 100 and "zonal gateways" 102.

The exemplary hierarchical topology illustrated in FIG. 1 comprises:

a central gateway/switch 100: a high-speed backbone network can be based on a switched Ethernet network (central gateway) for inter-domain communication;

a set of domain gateways 102 that can "hide" sub-network peculiarities to the Ethernet backbone (e.g., CAN2Ethernet, FlexRay2Ethernet, LIN2Ethernet, etc.); and electronic devices 104 that are grouped into domains based on functionality (e.g., in the case of automotive applications: power train, chassis, advanced driver assistance system or ADAS, body &comfort).

By way of introduction, the meaning of various abbreviations used throughout this description (mostly known to those of skill in the art) will now be recalled for immediate reference:

VM—virtual machine
VMP—virtual machine ports
VMID—virtual machine identifier
VMEID—virtual machine extended identifier
VSID—virtual stream identifier
PP—physical ports (MAC ports, for instance)

4

AXIM—AXI master ports
VMB—virtual machine bridge
QoS—quality of service
SP—strict priority
PCP—priority code point
FLEX_SGS—flexible/safe gateway/router/switch In FLEX_SGS interconnect physical (MAC Ethernet, for instance) and virtual machine (SOC interfaces, AXIM for instance) ports virtualization can be implemented in two different modes:

at SOC/FLEX_SGS (VM bridge) level by the introduction of a VMID to tag any delivered L2/L3 packet linked to a VMP; VMPs are implemented as physical ports inside FLEX_SGS; or at SOC/FLEX_SGS (in-depth) level by the introduction of the VMID inside the L2 forwarding database/L3 routing table.

In networks for use, for instance, in the automotive sector, various protocol layers, designated L1 to L7, can be defined as follows:

Layer 1 or L1 protocol (physical): to transmit bits over a medium (e.g., Ethernet physical layer);

Layer 2 or L2 protocol (data link): to organize information into frames and handle intra-network delivery;

Layer 3 or L3 protocol (network): to handle internetworking communication (host-to-host communication);

Layer 4 or L4 protocol (transport): to provide a reliable message communication (e.g., packet re-ordering, packet re-transmission) system between processes;

Layer 5 or L5 protocol (session): to establish a communication between two hosts;

Layer 6 or L6 protocol (presentation): to compress and/or encrypt data; and

Layer 7 or L7 protocol (application): to allow access to network resources.

For instance:

an Ethernet switch operates at the L2 layer;

a router operates at the L3 layer; and a gateway operates on different types of L2 protocols by encapsulation/decapsulation based on a defined hierarchy of protocols.

Figure 2:
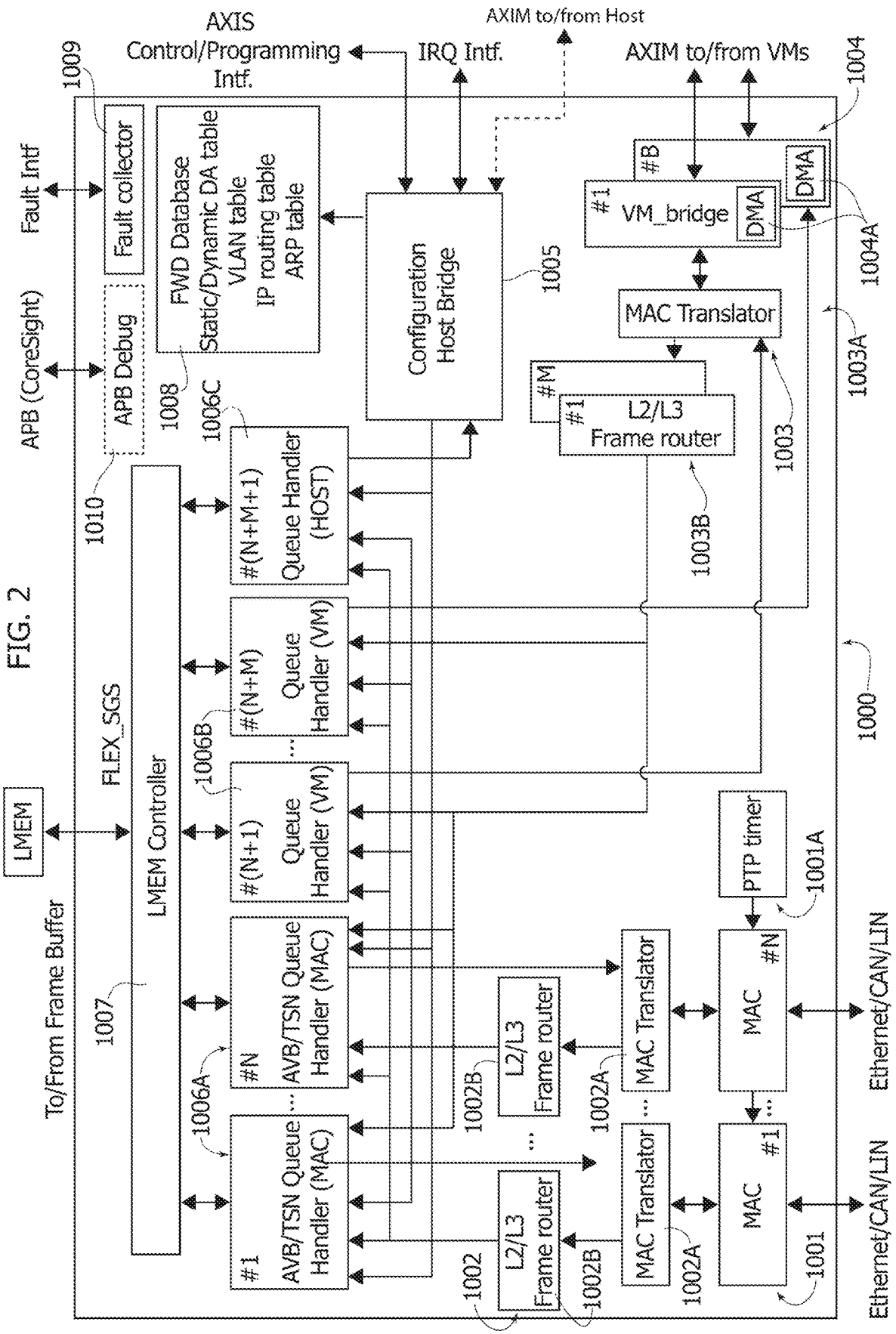
FIG. 2 is a general block diagram of network architecture for use in the automotive sector, for instance.

Architecture as illustrated in FIG. 2 is substantially as discussed in Italian Patent application No. 102022000019233 ("Network architecture, corresponding vehicle and method", Borgonovo, Re Fiorentin, Inventors) not yet available to the public at the time of filing the present application.

System architecture as exemplified in FIG. 2 supports a number of main features/functions as detailed in the following:

HW network accelerator: packet forwarding at wire speed, non-blocking, high performance;

forwarding database: static MAC DA (multicast)/masks, static/dynamic (learning) MAC DA (unicast) Hash table, static VLAN ID Hash table, static IPv4/IPv6 addresses/masks routing table, ARP table;

L2 frame classification and forwarding based on MAC DA, VLAN ID;

L2+ frame classification and forwarding based on MAC DA, IPv4/IPv6 addresses, ARP table;

L2 flow from/to MAC ports, from VMP to MAC ports, from MAC to VMP ports (optional);

L2+ flow from/to VMP ports, from MAC to VMP ports;

input priority re-generation x MAC/VMP port;

reduced latency, and reliable throughput requirements by quality of service (QoS): threshold/cut-through mode in addition to the store & forward mode;

QoS based on 8× traffic classes with different schedulers/
    shapers;
scheduling algorithms: strict priority, weighted round
    robin (WRR);
bandwidth shapers: credit-based shaper (CBS), time
    aware shaper (TAS) per MAC destination port;
concurrent frame management via multiple/configurable
    queues mapped in LMEM x MAC/VMP destination
    port and traffic class;
SW (host) queue mapping in LMEM for local frames+
    broadcast and multicast frames+PTP, MKA, and so on;
local memory controller (buffer management, interleav-
    ing addressing schemes, multiple memory banks);
virtual machine bridge (VMB) including an embedded
    high-end AXIM DMA (multi-channels) for the L2/L3
    data flow from/to VMP ports (VMs running on SoC);
    and
security: MACsec integrity check and MKA (key agree-
    ment protocol) protocols (hop2hop protection), con-
    figuration via HSM (secure port).
In a networking accelerator 1000 as illustrated in FIG. 2,
reference number 1001 collectively designates a set of
internal Ethernet/LIN/CAN/other MAC controllers (#1 to
N, with N=32, for instance). These controllers (clocked by
a precision time protocol timer 1001A) control data
exchange over an Ethernet/LIN/CAN/other data link—not
visible in the figures.

Reference number 1002 collectively designates Ethernet/
LIN/CAN/other MAC "wrappers" (#1 to #N, with N=32, for
instance) including MAC translator and (L2/L3) frame
router features, designated 1002A and 1002B, respectively.

The MAC translator features 1002A act between the
MAC controllers 1001 and the frame router features 1002B.

Reference number 1003 collectively designates virtual
machine (VM) wrappers (#1 to #M) including MAC trans-
lator and frame router (L2/L3) features indicated 1003A and
1003B, respectively.

The MAC translator features 1003A act between the
frame router features 1003B and a virtual machine (VM)
bridge (e.g., AXIM translator) blocks collectively desig-
nated 1004 that include direct memory access (DMA) fea-
tures to interface with SoC internal virtual machines
(VMs—not visible in the figure) via an AXIM interface.

Architecture as illustrated in FIG. 2 comprises a SW
Ethernet port (bridge) 1005 for a host. This bridge comprises
an AXIS wrapper 1005 including a MAC translator feature
and a L2/L3 frame router feature plus an AXIS bridge
coupled with the wrapper 1005 for the configuration and
management of the network by a host, via an AXIS control
and programming interface and an Interrupt ReQuest (IRQ)
interface.

The designation "wrapper" is used herein in its current
meaning to designate a hardware module (software config-
urable) that "wraps" one or more other modules or features
thus acting as an intermediary between its own clients (that
use the wrapper interface) and the wrapped module(s) that
implement the requested functions as a deputy of the wrap-
per object.

A bridge 1005 including AXIS and IRQ interfaces can be
regarded as exemplary of an Ethernet interface port.

For instance, the user's Manual for the AXIS 1611 Net-
work Interface Card as retrievable at the URL "www.axis-
.com/dam/public/26/5d/64/axis-1611-network-interface-
card-for-canon-capt-printers--user%E2%80%99s-manual-
en-US-30913.pdf" indicates that the AXIS 1611 is designed
for 10 Mbps and 100 Mbps Fast Ethernet networks. The
AXIS 1611 is equipped with an auto-sensing function that detects the speed of the local network segment and varies the
speed of its data communication accordingly, between 10
Mbps and 100 Mbps. Also, a basic tutorial on Ethernet
interfaces as retrievable at the URL "docs.nvidia.com/net-
working/display/MLNXENv521040/Ethernet+Interface"
expressly includes a section devoted to Interrupt Request
(IRQ) Naming, explaining, that once IRQs are allocated by
the driver, they are named mlx5_comp<x>@pci:<pci_addr>
so that the IRQs corresponding to the (interface, n.d.r.)
channels in use are renamed to <interface>-<x>, while the
rest maintain their default name.

The representation in dashed lines on the right-hand side
of FIG. 2 highlights the possibility of configuring the block
1005 (referred to as a configuration host port in Italian Patent
application No. 102022000019233, already cited) as a
bridge 1005 via AXIM to/from a host.

In FIG. 2, reference numbers 1006A, 1006B and 1006C
designate three sets of (e.g., sixty-five) queue handlers for
the queue management and QoS functionalities in co-opera-
tion with a local memory controller 1007.

The local memory controller 1007 can be configured as a
multi-port memory controller to access the SRAM/frame
buffer in a local memory LMEM (usually this is a distinct
element with respect to architecture 1000).

As illustrated in FIG. 2, the three sets of queue handlers
comprise:
a first set of queue handlers 1006A (#1 to #N) for MAC
    controllers 1001;
a second set of queue handlers 1006B (#(N+1) to #(N+M)
    for virtual machine (VM) wrappers (#1 to #M) 1003;
    and
a (single) queue handler 1006C (#(N+M+1)) for the host
    port 1005.

Reference 1008 in FIG. 2 denotes a L2/L2+ forwarding
database (static DA tables, dynamic DA hash tables, VLAN
ID hash tables, IP address routing tables, ARP table) con-
figured to co-operate with the SW port 1005, e.g., for
receiving therefrom configuration and management instruc-
tions from the host.

Architecture as illustrated in FIG. 2 also comprises func-
tional safety mechanisms (SMs) such as, e.g., a fault col-
lector feature 1009 configured to cooperate with a fault
interface Fault Intf (not visible in the figure) and an
advanced peripheral bus (APB) debug feature 1010 config-
ured to cooperate with an APB CoreSight® interface (not
visible in the figure).

Multiple (4×) functional layer architecture for a gateway/
router/switch architecture as exemplified herein can be
implemented to include a number of sections (sub-systems).

A first section is an Ethernet/LIN/CAN/VM/Other MAC
port layer, e.g., the MAC controllers 1001 and the MAC
wrappers 1002.

This section can implement a conventional data link (e.g.,
Ethernet/CAN/LIN) layer for a specific protocol as well as
a proprietary data link interface to transfer status/header/
payload for each frame which can be exposed to the next
layer (MAC generic frame layer).

Another section is a MAC (generic) frame layer for
switch (L2)/routing (L2+) functions (physical/virtual
machine/configuration host destinations), e.g., the virtual
machine (VM) wrappers 1003.

As exemplified herein, this layer includes two distinct
sub-sections, namely:
a MAC translator 1003A to re-map a specific data link
    interface (Ethernet/LIN/CAN/VM/Other) into a
    generic frame interface; and a switch (L2)/router (L2+) function 1003B to deliver the frame to the queue handler (QHND) in the set 1006B of the destination port, according to the forward database (L2/L2+).

Advantageously, the interface between the router/switch 1003B and the QHND is a point-to-point interface, defined as Tx_frame interface and Rx_frame interface.

As exemplified herein, a queue (data, status) handler layer (QHND) per destination port (Ethernet/LIN/CAN/VM, namely 1006B) and configuration host port (namely 1006C), is provided to implement the QoS function.

Each data/status queue is re-mappable based on the frame priority, and is configurable in terms of size, base address, filling/emptying thresholds, for mapping in the memory LMEM.

Filling/emptying/underflow/overflow status can be monitored by asserting interrupts.

As exemplified herein, each QHND layer (e.g., 1006A, 1006B, 1006C) includes two sub-sections (write and read), namely a write QHND and a read QHND.

The write QHND supports concurrent incoming frames received from any Ethernet/LIN/CAN/VM/other MAC port (e.g., at 1001). The Rx_frame interface (point to point) includes flow control, destination port, queue index, data, attributes, frame alignment, frame status, timestamp and safety mechanisms. The frames delivered to a same destination port with a different queue index are concurrently delivered to the next layer (multi-port memory controller).

The read QHND implements the QoS for the outgoing frames to any Ethernet/LIN/CAN/VM/Other MAC port. The scheduler supports different types of algorithms: strict priority, WRR (weighted round robin and/or different types of shapers such as credit based, time aware) according to the related standards.

As exemplified herein, a pre-fetch buffer is implemented on the read data path from the memory LMEM via the controller 1007 to avoid underflow conditions on the Tx side in case of contention/bandwidth limitation on the LMEM memory and/or in cut-through mode; the Tx frame interface (point to point) includes flow control, data, attributes, frame alignment, frame status, timestamp and safety mechanisms.

As exemplified herein, a multi-port memory controller layer 1007 is provided for bandwidth optimization according to the overall bandwidth required by the source/destination ports. The interface between the local memory controller (LMC) 1007 and the QHND features 1006A, 1006B and 1006C is a point-to-point interface per destination port and per queue that includes flow control, data, address, access type, safety mechanisms.

As exemplified herein, the virtual machine bridge (VMB) 1004 implements a bridge to transmit/receive L2/L2+ frames to/from a virtual machine mapped at SOC level (not visible in the figure) on a multi-core architecture. The L2/L2+ frames are memory mapped in a system memory (SMEM, not visible in the figures) and the virtual machine bridge (VMB) 1004 is controlling the control/data flow from/to such a memory via an AXIM interface, to/from the internal switch via data link interface.

A VMB-Rx direct memory access (DMA) as exemplified herein supports multi-channel (multi frame buffers in system memory linked to multiple DMA descriptors) and/or multi-frames (linked to a single DMA descriptor) for data flow transfer.

A VMB-Tx DMA as exemplified herein supports multi-channel (multi frame buffers in system memory linked to multiple DMA descriptors) and/or multi-frames (linked to a single DMA descriptor), and dynamic transfer (ingress frame linked to a DMA descriptor depending on the frame attribute, e.g., priority, UDP/TCP port, . . . ) for data flow transfer.

The virtual machine port (VMP) thus implemented corresponds to a MAC port. Thanks to the frame routers 1003B, frames such as L2/L2+ frames can be delivered from/to any VM/MAC port.

System architecture as exemplified herein lends itself to implementing, for instance, the following data flows:

L2/L2+ frames from/to MAC/VMP to/from MAC/VMP via internal switch, MAC/VMP port;

L2/L2+ frames from/to HOST to/from MAC via AXIS bridge 1005, internal switch, MAC port; and L2/L2+ frames from/to HOST to/from VM via AXIS bridge 1005, internal switch, AXIM write/read DMA 1004A, MAC port.

In system architecture as exemplified herein, the embedded AXIM DMA features 1004A can be shared (depending on the static configuration) over multiple virtual machine ports (VMP) and support the L2/L2+ frames delivery from/to SMEM in streaming mode by N-channels configured by (VMB-RX) or N*D (VMB-TX) descriptors of the DMA to control the Xfer features such as base/start address, burst maximum length, frame max/actual length, number of frames (sequential buffering mode), frame type, etc.

A hierarchical (two-layer) round-robin arbitration scheme can be implemented in the queue handlers 1006B to grant the AXIM on the VM port (first layer with higher priority) and (second layer with lower priority) on the DMA channel.

In system architecture as exemplified in FIG. 2, AXIM transactions linked to each VM port are protected by a VMID identifier to grant the access to the memory regions allocated for the VM (isolation function) ports.

In system architecture as exemplified in FIG. 2, the configuration host port (bridge) 1005 is configurable via AXIS slave port or embedded DMA, e.g., as AXIS slave port or AXIM master port (via an internal DMA).

A memory map interface is implemented to allow L2/L2+ frames delivery by the host equivalently to any Ethernet/LIN/CAN/VM/Other MAC port.

In case of incoming frames handled as SW frames (e.g., DA=multicast address per control frame), in system architecture as exemplified herein the configuration host can automatically deliver the frame response with DA=multicast address on all the ports that have received the frame with/without bypassing the forwarding database.

A timestamp (TS) optionally captured on the input port of any physical MAC port (e.g., Ethernet) can be delivered via a status queue (internal switch) to the related physical MAC destination port to support in HW w/o SW intervention the PTP end-to-end transparent clock 1-step mode protocol. A timestamp (TS) optionally captured on the input port of any physical MAC port (e.g., Ethernet) can be delivered via a status queue (internal switch) to the related HOST/VM port In system architecture as exemplified in FIG. 2:

the L2/L2+ frame transmission on the granted queue according to the QoS configuration can be optionally initiated on threshold level (cut-through mode) in order to minimize the latency of the switch;

an IPv4/IPv6 routing table partitioning per horizontal/vertical memory banks can be advantageously provided to reduce the latency time introduced for the IP address searching; and a flush mechanism of the incoming Rx frames on any Ethernet/LIN/CAN/VM/other MAC port at 1001 is implemented by the write QHND to recover the queue status w/o to cause the unavailability of the switch, with the exception for the lost frames affected by the related fault condition (e.g., CRC, parity errors on the data path, MAC overflow condition).

Advantageously, two policies are available (SW configurable) for the flush mechanism:

back-pressure flow-control (the queue handler is in hold state while the MAC is buffering (FIFO) or flushing); and per queue flow control (the last frame of the full queue is flushed by the queue handler).

It is noted that, while listed together and optionally combined, the joint presence of these features is not mandatory.

In system architecture as exemplified herein, a gateway functionality for LIN/CAN/other protocols (FEATURE on-development) may be provided wherein:

LIN/CAN frames can be optionally encapsulated/decapsulated into/from Ethernet frames or directly forwarded to LIN/CAN physical ports; and LIN/CAN forwarding database includes an address resolution table (LIN/CAN ID to MAC DA address) and port/address forwarding table (TBC/TBD).

It is again noted that, while certain features of the examples presented herein are listed together and combined, the joint presence of these features is not mandatory.

System architecture as exemplified herein is statically configurable in respect of parameters such as, e.g., number of MAC ports, number of VM ports, number of AXIM interfaces (DMA), number of queues, number of LMEM ports, and/or L2/L2+ forwarding database size.

Advantageous functional safety (FUSA) features (e.g., 1009, 1010) of system architecture as exemplified herein may include:

watchdog counters (up/down) and/or timers on the control signals (req/ack) of each interface (external: AXIM, AXIS, . . . , internal: Rx_frame/Tx_frame interfaces, and so on);

QHND Tx frame counters, Rx frame counters, LMEM pending frame counters x destination port x queue in order to monitor the flow control between the Rx_frame and Tx_frame interfaces;

QHND destination port selector (Rx_frame interface) replication in the status queue of the frames transmitted, to validate the correct frame delivery on the actual destination port;

QHND full data/status queues interrupts to monitor the flow control x queue/destination port;

QHND AVB/CBS average bandwidth monitors x queue/transmitting port;

QHND TAS time aware shaper monitors x queue/transmitting port;

end-to-end protection (parity bits) on the data paths from/to source/destination ports;

memory data protection by error correcting code (ECC); and frame erroring (to MAC/VM TX path) to invalidate the egress frame in case of fault conditions.

Once more, certain features of the solution presented herein being listed together and combined does not imply that the joint presence of these features is mandatory.

System architecture as represented in FIG. 2 is exemplary of an arrangement that provides a number of advantages related to features such as:

use of a single physical port connected to the configuration HOST;

an increased number of physical ports bridged to single or multiple SOC interfaces (e.g., AXIM) via internal bridge; and virtualization by multiple VM physical ports connected to multiple VM bridges in order to provide a high-performance DMA service to transfer the L2/L3 packets for a subset of VM physical ports (physically connected to the VM bridge) and to tag L2/L3 packets on the SOC interfaces (AXIM, for instance) via an VMID identifier linked to each VM port.

As noted in the introductory portion of this description, developments in automotive technology are continuous and rapid, with new and complex automotive applications that set ever-increasing connectivity/bandwidth requirements for in-vehicle connections.

The ability to integrate efficient network accelerators capable of switching/routing packets among internal SOC network ports (AXIM ports) with minimal area overhead thus plays an important role in new-generation automotive gateway processors.

In that context, system architecture as represented in FIG. 2 was found to be exposed to drawbacks such as:

bandwidth/latency limitations and configuration HOST load, for the single physical port;

switch complexity and cost increasing for the multi-physical ports; and virtualization partially implemented only to support isolation of the L2/L3 packets.

Adequately exploiting the large bandwidth of SOC interfaces while minimizing the number of physical/VM ports of a switch and keeping a high number of virtual machine, VM ports may represent a challenging goal to pursue.

Figure 3:
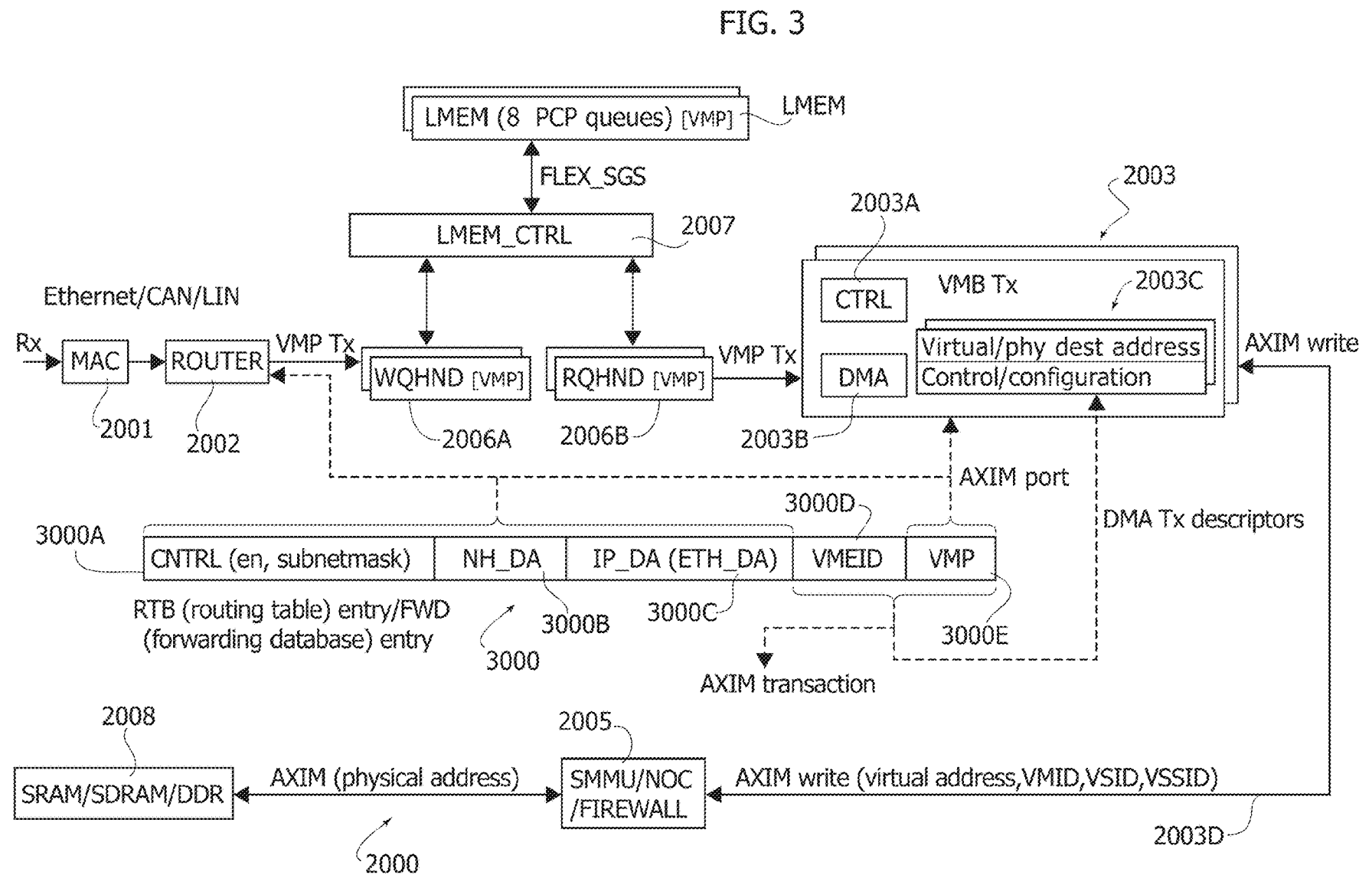
Figure 4:
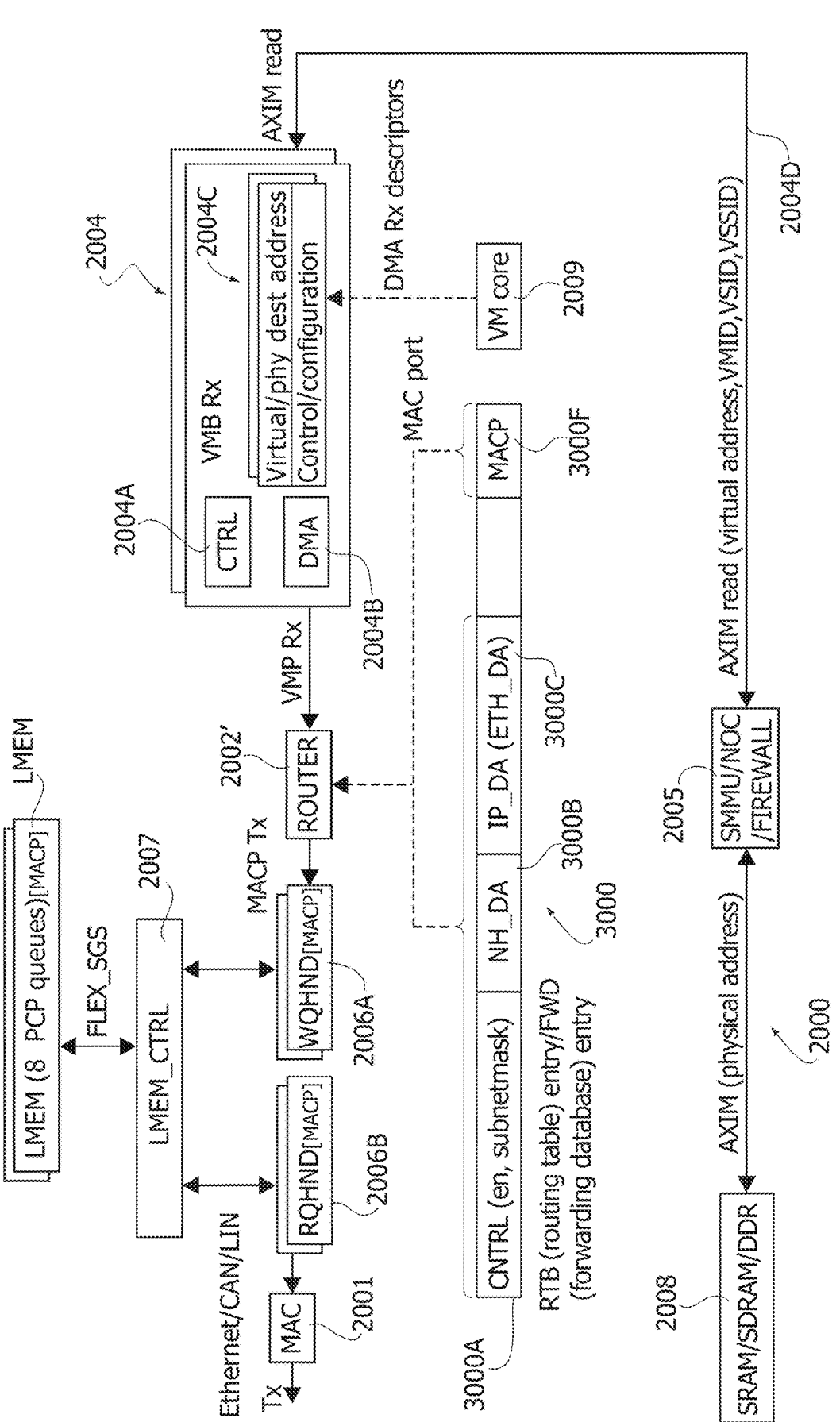

Arrangements as illustrated in FIGS. 3 and 4 facilitate pursuing that goal via a routing table (for L3)/forwarding database (for L2) entry and VMB extensions to support virtualization in a networking accelerator 2000 that can be configured for data exchange over an Ethernet/LIN/CAN/other data link (again not visible in the figures for simplicity).

As already noted in connection with FIG. 2, system architecture as exemplified herein lends itself to implementing various types of data flows, such as, for instance:

L2/L2+ frames from/to MAC/VM to/from MAC/VM via internal switch, MAC/VM port;

L2/L2+ frames from/to HOST to/from MAC via AXIS/AXIM bridge 1005 from a HOST interface internal switch, MAC port; and L2/L2+ frames from/to HOST to/from VM via AXIS/AXIM bridge 1005, internal switch, AXIM write/read DMA 1004A, MAC port.

As illustrated, data exchange may include different operation modes via MAC controller circuitry, collectively indicated as 2001, with the intervention of router (for L3) and/or switch (for L2) circuitry, designated 2002 in the case of FIGS. 3 and 2002' in the case of FIG. 4.

The case of FIG. 3 (referred to for simplicity as "reception": in fact, VM transmission) and the case of FIG. 4 (referred to for simplicity as "transmission": in fact, VM reception) are general examples of:

system architecture where data (frames) are transferred from a physical location to a virtual(ized) location ("reception", as exemplified in FIG. 3); and system architecture where data (frames) are transferred from a virtual(ized) location to a physical location ("transmission", as exemplified in FIG. 4).

While that case is not illustrated in order to avoid making the present description unduly lengthy and complex, solutions as exemplified herein lend themselves to being used also in architectures where data (frames) are transferred between virtual (source and destination) locations.

Advantageously, system architectures as exemplified in FIG. 3 and in FIG. 4, respectively, can be instantiated and be used jointly so that architecture exemplified in FIG. 4 can exploit virtual machine (reception) descriptors homologous to the virtual machine (transmission) descriptors defined as discussed in connection with FIG. 3, namely identified via a virtual machine port, VMP tag in combination with a virtual machine extended identifier, WMEID.

The term "homologous" is used herein with its common meaning identifying entities based on a same relationship or structure.

Also, in order to avoid making the present description unduly lengthy and complex, the description related to FIGS. 3 and 4 is provided here by taking FIG. 2 and the related description as a reference.

Consequently, whenever consistent with FIGS. 3 and 4, details of parts and elements already described in connection with FIG. 2 will apply to corresponding parts and elements appearing in FIGS. 3 and 4; for brevity, a detailed description will not be repeated for FIGS. 3 and 4.

In FIGS. 3 and 4, references 2003, 2004 denote virtual machine bridge, VMB transmission (VMB Tx—FIG. 3) and VMB reception (VMB Rx—FIG. 4) circuitry including:

a controller 2003A, 2004A, respectively;

direct memory access, DMA circuitry 2003B, 2004B respectively; and a virtual/physical destination address facility (configuration registers, DMA descriptors) 2003C, 2004C, respectively, which can be configured to take advantage of a virtual machine extended identifier, VMEID as discussed in the following.

Optionally, the facility 2003C, 2004C is capable of handling a virtual stream identifier, VSI, plus a virtual substream identifier, VSSID (in case of memory virtualization by a system memory management unit)

The virtual machine bridge, transmission circuitry (VMB Tx) 2003 of FIG. 3 and the virtual machine bridge, reception circuitry (VMB Rx) 2004 of FIG. 4 can be configured to handle data flows (AXIM write designated 2003D in FIG. 3 and AXIM read designated 2004D in FIG. 4) exchanged on virtual machine ports, VMPs (VMs running on SoC, for instance) in co-operation with a system memory 2008.

Co-operation may take place with or without the intervention of circuitry 2005 configured to act as system memory management unit, SMMU; Network on Chip, NOC or firewall.

The memory 2008 may be, for instance, a SRAM (static random-access memory), a SDRAM (synchronous dynamic random-access memory), or a DDR (double data rate) memory configured to exchange physical address information (AXIM, for instance) with the circuitry 2005.

If provided, the circuitry 2005 can facilitate sharing profile page tables with peripherals, providing virtual device support compatibility at the system level.

Data flow between the VMB Tx, Rx circuitry 2003, 2004 and the memory 2008 can take place over an (embedded) high-end direct memory access, DMA (multi-channel) link. An AXI protocol can be a possible choice for that purpose. This may involve an AXIM interface with AXIM write phases (FIG. 3) and AXIM read phases (FIG. 4).

A system 2000 as discussed herein is thus exemplary of a system comprising:

media access control, MAC controller circuitry 2001 configured to provide a MAC port layer controlling exchange of information over a data link (Ethernet/CAN/LIN, for instance); and virtual machine transmission VM Tx bridge circuitry (2003 in FIG. 3) and virtual machine reception VM Rx bridge circuitry (2004 in FIG. 4) configured to handle transmission/reception data flows from/to virtual machine ports, VMPs in co-operation a memory such as the memory 2008.

That is, architecture as illustrated in FIGS. 3 and 4 is configured to:

write data (see AXIM write in FIG. 3) into the memory 2008 via data flow to the virtual machine ports, VMPs; and/or read data (see AXIM read in FIG. 4) from the memory 2008 via data flow from the virtual machine ports, VMPs.

Both write and read phases may benefit from the availability of virtual address, and virtual machine identifier, VMID information, optionally including VSID and VSSID information as discussed in the foregoing.

In architecture as illustrated in FIG. 3, the path between the MAC controllers, 2001 and the virtual machine transmission VM Tx bridge circuitry 2003 includes the router 2002 (MAC protocol, MACP) and the write queue handlers (WQHND) 2006A plus the read queue handlers (RQHND) 2006B co-operating with a local memory controller 2007 and related local memory, with the write queue handlers (WQHND) 2006A and the read queue handlers (RQHND) 2006B arranged between the router 2002 and the VM Tx circuitry 2003.

In architecture as illustrated in FIG. 4, the path between the MAC controllers, 2001 and the virtual machine reception VMB Rx bridge circuitry 2004 includes the router 2002' and the write queue handlers (WQHND) 2006A plus the read queue handlers (RQHND) 2006B co-operating with a local memory controller 2007 and related local memory, with the router 2002' arranged between the VM Rx circuitry 2004 and the write queue handlers (WQHND) 2006A plus the write queue handlers (RQHND) 2006B arranged between the memory controller 2007 and the MAC controllers 2001.

It is noted that the write queue handlers 2006A and the read queue handlers 2006B are configured to "swap" their roles in architecture as illustrated in FIG. 3 ("reception"-Rx, that is, VM transmission) and in architecture as illustrated in FIG. 4 ("transmission"-Tx, that is VM reception).

In architecture as illustrated in FIG. 3:

the router or switch circuitry 2002 is coupled between the MAC controller circuitry 2001 and the queue handlers 2006A, 2006B with the queue handlers 2006A coupled to the router circuitry 2002 to receive therefrom virtual machine port transmission signals VMP Tx; and the signals VMP Tx are forwarded to the virtual machine bridge circuitry (VMB Tx) 2003 via the read queue handlers 2006B with the support of the local memory controller 2007.

In architecture as illustrated in FIG. 4:

the router or switch circuitry 2002' is coupled between the queue handlers 2006A, 2006B and the virtual machine bridge circuitry (VMB Rx) 2004;

direct memory access reception information from a virtual machine, VM core 2009 is supplied in the form of DMA Rx descriptors to the VM Rx circuitry 2004 (the virtual destination address 2004C); and the write queue handlers 2006A are coupled to the router circuitry 2002' to receive therefrom (as MACP Tx signals) virtual machine port reception signals VM Rx (from the virtual machine bridge 2004) that reach the read queue handlers 2006B with the support of the local memory controller 2007.

In both instances, the local memory controller 2007 can be configured as a multi-port memory controller in turn co-operating with a local memory LMEM (usually this is a distinct element with respect to the networking accelerator 2000).

The representations of FIGS. 3 and 4 are exemplary of the possibility of using (in both instances) a routing table, RTB or forwarding database, FWD 3000 in managing a networking accelerator 2000 instantiated, for instance, in the central/ domain/zonal gateways in architecture on board a vehicle V such as a motor car as illustrated in FIG. 1.

The designations routing table, RTB and forwarding database, FWD are used (in connection with L3 and L2 contexts of operation, respectively) to denote a data table 3000 stored in a router or a network host that lists the routes to network destinations.

The routing table/forwarding database can be stored in integrated network architecture 2000 as exemplified in both FIGS. 3 and 4 in any manner known per se to those of skill in the art. For instance, the routing table/forwarding database can be stored in a plurality of the memory banks associated with a dedicated memory controller (see block 1008 in FIG. 2, for instance).

As exemplified in FIGS. 3 and 4, such a routing table/ forwarding database 3000 can comprise the following fields:

3000A—control, CNTRL including enable and subnet-mask data signals;

3000B—next hop IP address field, NH_DA; and

3000C—destination IP address field IP_DA.

In the case of a forwarding database (L2 switch) the fields IP_DA and NH_DA are replaced by a field ETH_DA (Ethernet destination address).

As discussed in the following, the routing table/forwarding database 3000 exemplified herein also includes further fields, namely:

3000D and 3000E—applicable in case a frame (for instance a frame that is "received", that is, VM transmitted, as exemplified in FIG. 3) is to be routed to a virtual machine port, VMP; and

3000F—applicable in case a frame (for instance a frame that is "transmitted", that is VM received as exemplified in FIG. 4) is to be routed to a physical port, such as a MAC port, MACP.

The structure of the table 3000 is common for both cases, but the fields involved are different.

The control data field CNTRL, 3000A indicates whether to use the IP address of the IP packet or the next-hop IP address for the communication (over the Ethernet/CAN/LIN link), which is intended to be mapped to a respective MAC address to be inserted in the Ethernet/CAN/LIN frame.

Architecture as illustrated in FIG. 3 exploits (jointly) the two further tags 3000D and 3000E, namely:

3000D—virtual machine extended identifier, VMEID; and

3000E—virtual machine port, VMP.

Architecture as illustrated in FIG. 4 exploits a tag 3000F, namely a MAC port, MACP.

In architecture as illustrated in FIG. 3 virtual machine port transmission, VMP Tx takes place from the router/switch circuitry 2002 to the write queue handlers WQHND 2006A and from the read queue handlers RQHND 2006B to the virtual machine bridge 2003—configured for transmission (VM Tx) to the block 2005 and on to the memory 2008—with:

the fields/tags 3000A, 3000B, 3000C and 3000E made available to the router/switch circuitry 2002 and to the (AXIM, in the example considered) port to the virtual machine bridge, VM Tx 2003; and the tags 3000D and 3000E made available through the VMP Tx interface (status) to select the proper DMA Tx descriptor in the virtual machine bridge VM Tx 2003, thus facilitating AXIM transactions.

The tags 3000D and 3000E can thus be exploited to select the DMA Tx descriptor to control the DMA AXIM write transactions and the tag 3000E can also select the queue handler circuitry to allocate/select the physical queue mapped in the LMEM. The tag VMP selects a physical resource for buffering/queueing and the tag VMEID selects only a VM DMA Tx descriptor to implement the router/ switch virtualization, with both VMEID and VMP tags defining the VMID propagated on the AXIM interface.

In architecture as illustrated in FIG. 4, virtual machine port reception, VMP Rx takes place from the virtual machine bridge circuitry, VMB Rx 2004—configured for reception (VM Rx) from the memory 2008 via the circuitry 2005 (if present)—to the router/switch circuitry 2002' and on to the write queue handlers WQHND 2006A and from the read queue handlers RQHND 2006B to the MAC circuitry 2001 with:

the fields/tags 3000A, 3000B, 3000C and 3000F linked to the router/switch circuitry 2002' and thus to the (AXIM, in the example considered) port of the virtual machine bridge, VMB 2004 so that the VM Rx descriptor selection into the virtual machine bridge 2004, can take place via software, SW (in the VM core 2009, for instance); and the tags 3000D and 3000E linked as DMA Tx descriptors to the virtual destination address circuitry 2004C in the virtual machine bridge, VMB Rx circuitry 2004 thus facilitating AXIM transactions and the tag 3000F linked through the MACP TX interface (status) by the router 2002' to select the proper QHND resources (queue and destination port).

In this case the table 3000 is not used for virtualization in so far, in (purely exemplary) case considered here, the destination port is a MAC port.

The case of a "VM to VM" path (not visible for simplicity but representing a possible embodiment) can be implemented as a combination of architectures described in connection with FIGS. 3 and 4.

In that case, a VMEID field/tag can be used twice, namely:

to select a VM DMA Tx descriptor in the table 3000; and to select a (homologous) VM DMA Rx descriptor in/by the VM core 2009.

Parameters involved in instantiating a table such as the table 3000 exemplified herein include:

AXIM_N: number of ports (AXIM, for instance) or virtual machine bridge, VMB units;

AXIM_VMP_VN[AXIM_N-1:0]: number of VMP ports per VMB unit;

AXIM_VMEID_VN[AXIM_N-1:0]: number of maximum different VMEID tags supported by each VMB unit; and AXIM_VM_VN[  ]=AXIM_VMP_VN[  ]*AXIM_VMEID_VN[ ]=number of virtual machines, VM x AXIM_N.

In arrangements as illustrated herein, the VMP (virtual machine port) tag 3000E is provided to link a FLEX_SGS internal port/queue 2007 (8=PCP queues in a LMEM frame buffer), an AXIM port such as the one coupled to the line 2004A, and a direct memory access, DMA descriptor.

The virtual machine port, VMP tag 3000E can be linked/transported by each L3 frame (in the case of AXIM transactions, for instance). The same concept is applicable for a switch (using a forwarding database FWD) for L2 frames.

In arrangements as illustrated herein, the virtual machine extended identifier, VMEID tag 3000D is used to link DMA descriptors, with no FLEX_SGS internal port allocation (in terms of queue control, queue buffer, interconnect resources, and so on): for instance, multiple VMIDs can share the same queues (8 queues, for instance) in the FLEX_SGS port/queue indicated by 2007.

Optionally, in arrangements as illustrated herein, the VMEID tag 3000D can be linked/transported by each L3 frame (in the case of AXIM transactions) with virtual stream identifiers VSIDs and virtual sub-stream identifiers VSSIDs embedded in DMA (Tx) descriptors as supplied to the virtual machine bridge, VMB 2004.

In that respect, reference to fields/tags VSID, VSSID is merely by way of completeness. These fields are optional, in principle removable.

In arrangements as illustrated herein, the VSID and VSSID tags can thus be (optionally) linked/transported by each L3 or L2 frame (in the case of AXIM transactions, for instance).

Partial vs. full virtualization is provided depending on the tags VMEID (3000D) and VMP (3000E) entered in the table 3000.

In arrangements as illustrated herein bandwidth limitation factors in case of full virtualization are essentially dictated by AXIM bandwidth and latency (networks on chip, NOC) and LMEM bandwidth.

Flexibility thus exists in extending the number of virtual machines in so far as this is not constrained by the number of virtual machine ports, VMPs. For instance, eight priority code point, PCP queues per VMP can be shared by plural virtual machines in case of virtualization via a VMEID tag. Quality of service can be based on a stored procedure, SP, complete basis set, CBS extension of AXIM interface.

Arrangements as illustrated herein offer a degree of back-compatibility if the VMEID tag 3000D is not used and are applicable also to L2 frame switches as an extension of the DA dynamic table.

Without prejudice to the underlying principles, the details and embodiments may vary, even significantly, with respect to what has been described by way of example only without departing from the extent of protection.

The extent of protection is determined by the annexed claims.

A system (2000) can include: media access control, MAC controller circuitry (2001) configured to provide a MAC port layer to control exchange of information, wherein exchange of information includes data flow transmission to virtual machine ports, VMPs over a data link (Ethernet/CAN/LIN); virtual machine transmission, VM Tx bridge circuitry (2003) configured to handle transmission data flow to the virtual machine ports, VMPs; transmission router/switch circuitry (2002) configured to route/switch data flow from the MAC controller circuitry (2001) to the VM Tx bridge circuitry (2003); and queue handler circuitry (2006A, 2006B) configured to provide queue management for data flow between the MAC controller circuitry (2001) and the VM Tx bridge circuitry (2003), wherein the VM Tx bridge circuitry (2003) includes virtual destination address circuitry (2003C) configured to implement router/switch virtualization in said transmission router/switch circuitry (2002) with a virtual machine transmission descriptor (2003C) based on the combination of a virtual machine port, VMP tag (3000E) indicative of a physical resource in the queue handler circuitry (2006A, 2006B) selectable for data flow transmission, and a virtual machine extended identifier, VMEID (3000D).

The system can be configured to implement data flow transmission to a virtual machine port with data flow from the transmission router/switch circuitry (2002) to the queue handler circuitry (2006A, 2006B) and from the queue handler circuitry (2006A, 2006B) to the VM Tx bridge circuitry (2003) with the virtual destination address circuitry (2003C) in the VM Tx bridge circuitry (2003) configured to: detect both said virtual machine port, VMP tag (3000E) and said virtual machine extended identifier, VMEID (3000D); implement router/switch virtualization in said transmission router/switch circuitry (2002) via said virtual machine transmission descriptor (2003C) based on the combination of said virtual machine port, VMP tag (3000E) and said virtual machine extended identifier, VMEID (3000D); and select a physical resource in the queue handler circuitry (2006A, 2006B) based on said virtual machine port, VMP tag (3000E).

The virtual machine transmission descriptor (2003C) can be linked to the virtual machine port, VMP tag (3000E) and the virtual machine extended identifier, VMEID (3000D) as entry in a routing table/forwarding database (3000).

The system can be configured to implement data flow transmission with data flow from a virtual machine reception VMB Rx bridge (2004) to reception router/switch circuitry (2002') based on a virtual machine reception descriptor homologous to said virtual machine transmission descriptor (2003C), said virtual machine reception descriptor being selected, preferably via software, by a virtual machine, VM core (2009).

The system can be configured to implement data flow transmission both to and from virtual machine ports by: implementing data flow transmission with data flow from said transmission router/switch transmission circuitry (2002) to the VM Tx bridge circuitry (2003) based on said virtual machine transmission descriptor (2003C) obtained from a routing table/forwarding database (3000); and implementing data flow transmission with data flow from said virtual machine reception VM Rx bridge (2004) to reception router/switch circuitry (2002') based on said virtual machine reception descriptor selected by a virtual machine, VM core (2009).

The system (2000) can include a memory (2008), wherein the system can be configured to: write data (AXIM write) into said memory (2008) via data flow to the virtual machine ports, VMPs; and/or read data (AXIM read) from said memory (2008) via data flow from the virtual machine ports, VMPs.

A vehicle (V) equipped with an on-board communication network (100, 102, 104), wherein the network can include a system (2000) providing MAC/router/switch/gateway circuitry for said on-board communication network (100, 102, 104).

A method can include: controlling exchange of information including data flow transmission to virtual machine ports, VMPs over a data link (Ethernet/CAN/LIN) via media access control, MAC controller circuitry (2001) to provide a MAC port layer; handling transmission data flow to the virtual machine ports, VMPs via virtual machine transmission, VM Tx bridge circuitry (2003); routing/switching data flow from the MAC controller circuitry (2001) to the VM Tx bridge circuitry (2003) via transmission router/switch circuitry (2002); providing queue management for data flow between the MAC controller circuitry (2001) and the VM Tx bridge circuitry (2003) via queue handler circuitry (2006A, 2006B); and implementing router/switch virtualization in said transmission router/switch circuitry (2002) via virtual destination address circuitry (2003C) in the VM Tx bridge circuitry (2003) with a virtual machine transmission descriptor (2003C) based on the combination of a virtual machine port, VMP tag (3000E) indicative of a physical resource in the queue handler circuitry (2006A, 2006B) selectable for data flow transmission, and a virtual machine extended identifier, VMEID (3000D).

The method can include implementing data flow transmission with data flow from a virtual machine reception VMB Rx bridge (2004) to reception router/switch circuitry (2002') based on a virtual machine reception descriptor homologous to said virtual machine transmission descriptor (2003C), said virtual machine reception descriptor being selected, optionally via software, by a virtual machine, VM core (2009).

The method can include implementing data flow transmission both to and from virtual machine ports by: implementing data flow transmission with data flow from said transmission router/switch transmission circuitry (2002) to the VM Tx bridge circuitry (2003) based on said virtual machine transmission descriptor (2003C) obtained from a routing table/forwarding database (3000); and implementing data flow transmission with data flow from said virtual machine reception VM Rx bridge (2004) to said reception router/switch circuitry (2002') based on said virtual machine reception descriptor selected by a virtual machine, VM core (2009).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
media access control (MAC) controller circuitry configured to provide a MAC port layer to control exchange of information, wherein the exchange of information comprises data flow transmission to virtual machine ports (VMPs) over a data link;
transmission router/switch circuitry configured to route or switch data flow from the MAC controller circuitry to a VM Tx bridge circuitry;
queue handler circuitry configured to provide queue management for data flow between the MAC controller circuitry and the VM Tx bridge circuitry, wherein the transmission router/switch circuitry is coupled between the MAC controller circuitry and the queue handler circuitry; and
the VM Tx bridge circuitry configured to handle transmission data flow to the VMPs, wherein the VM Tx bridge circuitry comprises virtual destination address circuitry configured to implement virtualization of router or switch in the transmission router/switch circuitry with a virtual machine transmission descriptor that is based on a combination of (a) a virtual machine port (VMP) tag indicative of a physical resource in the queue handler circuitry selectable for data flow transmission, and (b) a virtual machine extended identifier (VMEID).

2. The system of claim 1, wherein the system is configured to implement data flow transmission to a virtual machine port with data flow from the transmission router/switch circuitry to the queue handler circuitry and from the queue handler circuitry to the VM Tx bridge circuitry with the virtual destination address circuitry in the VM Tx bridge circuitry configured to:
detect both the VMP tag and the VMEID;
implement the virtualization of router or switch in the transmission router/switch circuitry via the virtual machine transmission descriptor based on the combination of the VMP tag and the VMEID; and
select a physical resource in the queue handler circuitry based on the VMP tag.

3. The system of claim 1, wherein the virtual machine transmission descriptor is linked to the VMP tag and the VMEID as entry in a routing table or forwarding database.

4. The system of claim 1, wherein the system is configured to implement data flow transmission with data flow from a virtual machine reception (VMB Rx) bridge to reception router/switch circuitry based on a virtual machine reception descriptor homologous to the virtual machine transmission descriptor, the virtual machine reception descriptor being selected, via software, by a virtual machine (VM) core.

5. The system of claim 4, wherein the system is configured to implement data flow transmission both to and from virtual machine ports by:
implementing data flow transmission with data flow from the transmission router/switch transmission circuitry to the VM Tx bridge circuitry based on the virtual machine transmission descriptor obtained from a routing table or forwarding database; and
implementing data flow transmission with data flow from the VM Rx bridge to the reception router/switch circuitry based on the virtual machine reception descriptor selected by the VM core.

6. The system of claim 1, comprising a memory, wherein the system is configured to perform at least one of:
writing data into the memory via data flow to the VMPs; and/or
reading data from the memory via data flow from the VMPs.

7. A vehicle equipped with an on-board communication network, wherein the network comprises a system according to claim 1 to provide MAC/router/switch/gateway circuitry for the on-board communication network.

8. A method, comprising:
controlling exchange of information comprising data flow transmission to virtual machine ports (VMPs) over a data link via media access control (MAC) controller circuitry to provide a MAC port layer;
handling transmission data flow to the VMPs via virtual machine transmission (VM Tx) bridge circuitry;
routing or switching data flow from the MAC controller circuitry to the VM Tx bridge circuitry via transmission router/switch circuitry;

providing queue management for data flow between the MAC controller circuitry and the VM Tx bridge circuitry via queue handler circuitry, wherein the transmission router/switch circuitry is coupled between the MAC controller circuitry and the queue handler circuitry; and implementing virtualization of router or switch in the transmission router/switch circuitry via virtual destination address circuitry in the VM Tx bridge circuitry with a virtual machine transmission descriptor that is based on a combination of (a) a virtual machine port (VMP) tag indicative of a physical resource in the queue handler circuitry selectable for data flow transmission, and (b) a virtual machine extended identifier (VMEID).

9. The method of claim 8, comprising implementing data flow transmission with data flow from a virtual machine reception (VMB Rx) bridge to reception router/switch circuitry based on a virtual machine reception descriptor homologous to the virtual machine transmission descriptor, the virtual machine reception descriptor being selected by a virtual machine (VM) core.

10. The method of claim 9, comprising implementing data flow transmission both to and from virtual machine ports by:

implementing data flow transmission with data flow from the transmission router/switch transmission circuitry to the VM Tx bridge circuitry based on the virtual machine transmission descriptor obtained from a routing table or forwarding database; and implementing data flow transmission with data flow from the virtual machine reception VM Rx bridge to the reception router/switch circuitry based on the virtual machine reception descriptor selected by the VM core.

11. A collection of non-transitory computer-readable media storing contents that, when executed by one or more processors, cause a method to be performed, the method comprising:

controlling exchange of information comprising data flow transmission to virtual machine ports (VMPs) over a data link via media access control (MAC) controller circuitry to provide a MAC port layer;

handling transmission data flow to the VMPs via virtual machine transmission (VM Tx) bridge circuitry;

routing or switching data flow from the MAC controller circuitry to the VM Tx bridge circuitry via transmission router/switch circuitry;

providing queue management for data flow between the MAC controller circuitry and the VM Tx bridge circuitry via queue handler circuitry, wherein the transmission router/switch circuitry is coupled between the MAC controller circuitry and the queue handler circuitry; and implementing virtualization of router or switch in the transmission router/switch circuitry via virtual destination address circuitry in the VM Tx bridge circuitry with a virtual machine transmission descriptor that is based on a combination of (a) a virtual machine port (VMP) tag indicative of a physical resource in the queue handler circuitry selectable for data flow transmission, and (b) a virtual machine extended identifier (VMEID).

12. The collection of non-transitory computer-readable media of claim 11, wherein the method comprises implementing data flow transmission with data flow from a virtual machine reception (VMB Rx) bridge to reception router/switch circuitry based on a virtual machine reception descriptor homologous to the virtual machine transmission descriptor, the virtual machine reception descriptor being selected by a virtual machine (VM) core.

13. The collection of non-transitory computer-readable media of claim 12, wherein the method comprises implementing data flow transmission both to and from virtual machine ports by:

implementing data flow transmission with data flow from the transmission router/switch transmission circuitry to the VM Tx bridge circuitry based on the virtual machine transmission descriptor obtained from a routing table or forwarding database; and implementing data flow transmission with data flow from the virtual machine reception VM Rx bridge to the reception router/switch circuitry based on the virtual machine reception descriptor selected by the VM core.

* * * * *